F. A. POCOCK.
WATER GAGE.
APPLICATION FILED FEB. 18, 1914.
1,240,251.
Patented Sept. 18, 1917.
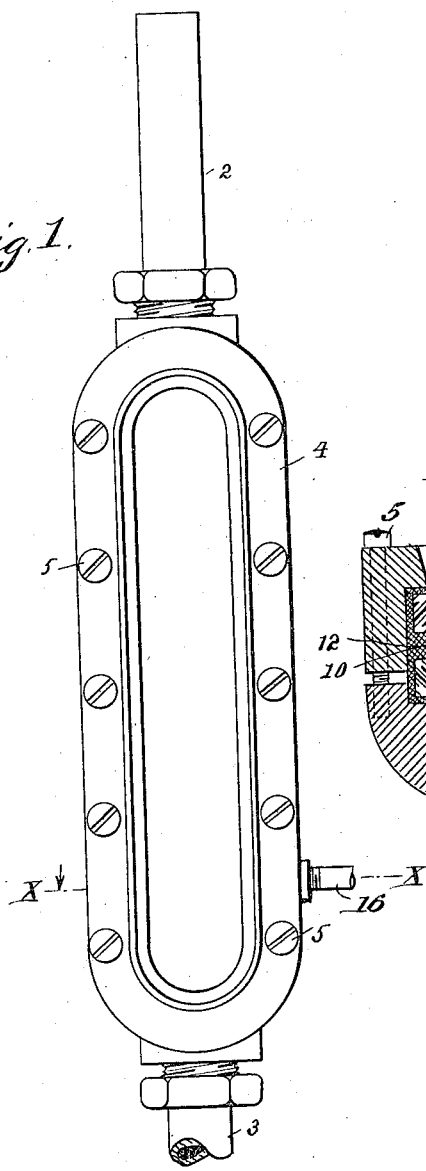
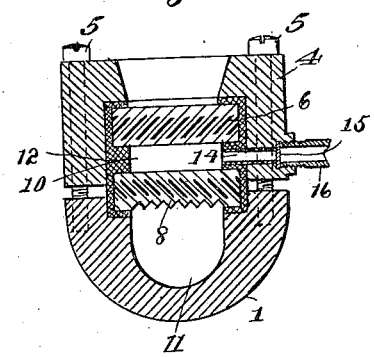
Witnesses
S. Williamson
M. Tobias
Inventor
Francis A. Pocock
W. W. Williamson
Attorneys

UNITED STATES PATENT OFFICE.

FRANCIS A. POCOCK, OF PHILADELPHIA, PENNSYLVANIA.

WATER-GAGE.

1,240,251. Specification of Letters Patent. Patented Sept. 18, 1917.

Application filed February 18, 1914. Serial No. 819,466.

*To all whom it may concern:*

Be it known that I, FRANCIS A. POCOCK, a citizen of the United States, residing at Philadelphia, in the county of Philadelphia and State of Pennsylvania, have invented new and useful Improvements in Water-Gages, of which the following is a specification.

My invention relates to new and useful improvements in water gages, and the like, and has for its object to provide a device of this description, more especially the glass therefor, for equalizing the pressure and temperature upon the glass which comes in immediate contact with the water and steam in the gage, thereby lessening the possibility of this glass breaking and also overcoming the danger of the hot water and steam escaping from the gage, should the inner glass break, thus protecting the engineer, fireman or other attendant from injury.

This present invention especially pertains to flat glass gages, and those in which reflecting glasses are used.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawing forming a part of this specification, in which—

Figure 1, is a face view of a water gage made in accordance with my improvement; and Fig. 2, is a section on the line *x—x* thereof.

In carrying out my invention as here embodied 1 represents the body of the gage provided with nipples 2 and 3 for connection with the boiler fixtures in the ordinary manner and 4 represents the face plate which is held in place upon the body by screws 5. The numeral 8 represents a reflecting glass which is packed directly against the face of the gage and the protector glass 6 is spaced therefrom by a suitable packing 12, thereby forming an air space 10, the protector glass being housed in the face plate 4.

By this arrangement it will be obvious that when steam and hot water are turned into the interior 11 of the gage, the heat transmitted therefrom to the reflecting glass 8 will in turn be transmitted to the air in the space 10 and by the expansion of the air a certain amount of compensating pressure will be exerted upon the outer surface of the reflecting glass, thereby counterbalancing to a degree the pressure exerted upon the inner face of said glass. This arrangement will also maintain the temperature on both sides of the reflecting glass at substantially the same degree, and this equalization of temperature and pressure will relieve the tendency of this glass to breakage.

Should the reflecting glass break from any cause, the shattered parts thereof will be retained within the protector glass, thus preventing injury to the engineer or other attendant, either from the outflow of steam and hot water or the flying of the shattered glass.

A further advantage of this construction is that so long as the reflecting glass remains unbroken the steam does not come in contact with the protector glass and therefore breakage which heretofore has been caused by the heating of the surface of the glass packed against the face of the gage is avoided.

A simple means of relieving the pressure within the gage should the reflecting glass 8 break consists of a tube 14 extending from one side of the packing 12 and having a blow out disk 15 held against the same by the pipe 16, the latter being threaded into the side of the face plate. By this arrangement a blow out disk of the desired strength to determine the point at which the pressure will be relieved will prevent undue strain from coming upon the protector glass.

Of course I do not wish to be limited to the exact details of construction as herein shown, as these may be varied within the limits of the appended claims without departing from the spirit of my invention.

Having thus fully described my invention, what I claim as new and useful, is—

1. A water gage comprising a body, an inner transparent wall forming with the body a liquid chamber, an outer transparent wall parallel with the first named wall and spaced therefrom, means for packing the transparent walls whereby a sealed pressure chamber is formed therebetween, a face plate for holding the parts in position, a tube in said face plate communicating with the chamber, a disk mounted against one end of said tube, and a pipe for holding said disk in position and forming with said tube a communication from the chamber between the two transparent walls to the atmosphere, whereby the disk is blown out.

2. A water gage comprising a body, a reflecting glass forming with the body a liquid chamber, a protector or sight glass parallel with the first named glass and spaced therefrom to form a space or pressure chamber therebetween, means for packing said glasses, a face plate detachably secured to the body for holding the glasses and packing in position, and nipples for connecting the gage with the ordinary boiler fixtures.

In testimony whereof, I have hereunto affixed my signature in the presence of two subscribing witnesses.

FRANCIS A. POCOCK.

Witnesses:
MARY E. HAMER,
S. S. WILLIAMSON.

Copies of this patent may be obtained for five cents each, by addressing the "Commissioner of Patents. Washington, D. C."